(12) United States Patent
Czaplicki et al.

(10) Patent No.: US 12,319,848 B2
(45) Date of Patent: Jun. 3, 2025

(54) SOLID POLYMERIC ADHESIVE COMPOSITIONS HAVING HIGH USE TEMPERATURE, AND ARTICLES AND METHODS THEREOF

(71) Applicant: Zephyros, Inc., Romeo, MI (US)

(72) Inventors: Michael Czaplicki, Romeo, MI (US); Ira Miller, Niederharlach (FR)

(73) Assignee: ZEPHYROS, INC., Romeo, MI (US)

( * ) Notice: Subject to any disclaimer, the term of this patent is extended or adjusted under 35 U.S.C. 154(b) by 0 days.

(21) Appl. No.: 17/407,459

(22) Filed: Aug. 20, 2021

(65) Prior Publication Data
US 2021/0380855 A1    Dec. 9, 2021

Related U.S. Application Data

(62) Division of application No. 16/303,871, filed as application No. PCT/US2017/033293 on May 18, 2017, now abandoned.
(Continued)

(51) Int. Cl.
*C09J 163/04* (2006.01)
*B32B 15/092* (2006.01)
(Continued)

(52) U.S. Cl.
CPC ........... *C09J 163/04* (2013.01); *B32B 15/092* (2013.01); *B32B 37/1207* (2013.01); *C09J 5/06* (2013.01);
(Continued)

(58) Field of Classification Search
CPC .......... H02K 1/18; H02K 1/182; H02K 1/185; H02K 1/187
See application file for complete search history.

(56) References Cited

U.S. PATENT DOCUMENTS

| | | | |
|---|---|---|---|
| 3,530,087 | A | 9/1970 | Hayes et al. |
| 3,817,472 | A | 6/1974 | Abe |

(Continued)

FOREIGN PATENT DOCUMENTS

| | | | | | |
|---|---|---|---|---|---|
| JP | H11 302620 A | 11/1999 | | | |
| WO | 2015/011686 A | 1/2015 | | | |
| WO | WO-2015011686 A1 | * | 1/2015 | ............. | C08J 5/128 |

OTHER PUBLICATIONS

PCT International Search Report & Written Opinion dated Oct. 27, 2017, Application No. PCT/US2017/033293.
(Continued)

*Primary Examiner* — Alicia J Weydemeyer
(74) *Attorney, Agent, or Firm* — The Dobrusin Law Firm, P.C.

(57) ABSTRACT

The teachings herein are directed at solid polymeric adhesive compositions for adhering metal components, methods for compounding the polymeric adhesive compositions, articles including a component having the polymeric adhesive composition, methods for producing articles including curing a solid adhesive, and articles including the cured adhesive. Preferred solid polymeric adhesive compositions include a plurality of one or more epoxy resins and one or more polysulfones. In one preferred aspect, the teachings are directed at a stator ring (e.g., for a hybrid motor) including the polymeric adhesive composition for adhering components to a ring.

20 Claims, 4 Drawing Sheets

Related U.S. Application Data

(60) Provisional application No. 62/425,326, filed on Nov. 22, 2016, provisional application No. 62/341,786, filed on May 26, 2016.

(51) Int. Cl.
  *B32B 37/12* (2006.01)
  *C09J 5/06* (2006.01)

(52) U.S. Cl.
  CPC ....... *B32B 2363/00* (2013.01); *C09J 2463/00* (2013.01)

(56) References Cited

U.S. PATENT DOCUMENTS

| | | | |
|---|---|---|---|
| 3,944,631 A | 3/1976 | Yu et al. | |
| 3,984,497 A | 10/1976 | Owens et al. | |
| 3,985,703 A | 10/1976 | Ferry et al. | |
| 4,034,013 A | 7/1977 | Lane | |
| 4,096,202 A | 6/1978 | Farnham et al. | |
| 4,304,709 A | 12/1981 | Salee | |
| 4,306,040 A | 12/1981 | Baer | |
| 4,495,324 A | 1/1985 | Chacko | |
| 4,536,436 A | 8/1985 | Maeoka | |
| 4,818,803 A | 4/1989 | Harris | |
| 5,151,327 A * | 9/1992 | Nishiyama | B32B 27/20 |
| | | | 428/317.9 |
| 5,275,853 A | 1/1994 | Silvis | |
| 5,464,924 A | 11/1995 | Silvis et al. | |
| 5,962,093 A | 10/1999 | White et al. | |
| 6,063,839 A | 5/2000 | Oosedo et al. | |
| 2004/0221953 A1 | 11/2004 | Czaplicki et al. | |
| 2005/0003661 A1 * | 1/2005 | El-Hibri | G02B 1/041 |
| | | | 438/643 |
| 2008/0308212 A1 | 12/2008 | Sheasley et al. | |
| 2010/0108258 A1 | 5/2010 | Finter et al. | |
| 2010/0108259 A1 | 5/2010 | Aspin | |
| 2010/0280151 A1 | 11/2010 | Nguyen et al. | |
| 2011/0048637 A1 | 3/2011 | Kohli | |
| 2013/0002058 A1 * | 1/2013 | McIntosh | H02K 1/185 |
| | | | 310/43 |
| 2013/0049521 A1 * | 2/2013 | Sato | H02K 1/185 |
| | | | 310/216.008 |
| 2013/0149531 A1 | 6/2013 | Kosal et al. | |
| 2016/0160087 A1 * | 6/2016 | Miller | C08J 5/128 |
| | | | 525/65 |

OTHER PUBLICATIONS

Chinese Office Action, Application No. 201780031597.8 dated Oct. 30, 2020.

Chinese Search Report, Application No. 201780031597.8 dated Oct. 22, 2020.

European Office Action, Application No. 17730594.3 dated Oct. 26, 2020.

Huntsman (Advanced Materials High Performance Components; https://www.huntsman.com/advance_materials/Media%20Library/global/files/US%20High%20Performance%20Components%20Sel%Guide.pdf) Year: 2010.

Chinese Decision of Rejection dated Jan. 7, 2022, Application No. 201780031597.8.

Polymer Science Experiment, Li Huaming et al., Xiangtan University Press, 1st Edition, Dec. 31, 2011, p. 180.

Epoxy Adhesives, He Manluo et al, Sinopec Publishing House, 1st edition, Apr. 30, 2004, pp. 140, 141.

Engineering and Technology Research on Low Carbon Alcohol Catalysis, Jiao Gengsheng et al., Xi'an Jiaotong University Press, 1st Edition, Dec. 31, 2016, p. 140.

* cited by examiner

SOLID POLYMERIC ADHESIVE COMPOSITIONS HAVING HIGH USE TEMPERATURE, AND ARTICLES AND METHODS THEREOF

CLAIM OF PRIORITY

The present patent application claims priority to U.S. patent application Ser. No. 16/303,871 filed on Nov. 21, 2018, which claims priority to PCT Patent Application PCT/US2017/033293 filed on May 18, 2017, which also claims priority to U.S. Provisional Patent Application No. 62/425,326 filed on Nov. 22, 2016 and U.S. Provisional Patent Application No. 62/341,786 filed on May 26, 2016, each incorporated herein by reference in its entirety.

FIELD

The teachings herein are directed at solid polymeric adhesive compositions for adhering metal components, methods for compounding the polymeric adhesive compositions, articles including a component having the polymeric adhesive composition, methods for producing articles including curing a solid adhesive, and articles including the cured adhesive. Preferred solid polymeric adhesive compositions include a plurality of one or more epoxy resins and one or more polysulfones.

BACKGROUND

In order to reduce costs and/or improve performance, there is a continuing need to provide multi-component parts that are adhered by an adhesive composition. In many applications, such as in automotive (e.g., under the hood) applications, the ability to use specific adhesives are limited by the service temperature. To adhere components in these demanding applications, there is a continuing need for improved adhesive compositions.

Examples of epoxy adhesive compositions and epoxy compositions for use in applications such as prepregs for composites are described in U.S. Patent Application Publication No. US 2011/0048637, published on Mar. 3, 2011, U.S. Pat. No. 6,063,839 A issued on May 16, 2000, and U.S. Patent Application Publication No. US 2010/0280151, published on Nov. 4, 2010, U.S. Pat. No. 3,817,472 A issued on Jun. 25, 1974, and U.S. Pat. No. 3,530,087 A issued on Sep. 22, 1970, incorporated herein by reference in their entirety. Some of the compositions described in these references include epoxy resins and polysulfones. In many compositions, high concentrations of liquid epoxy and/or low concentrations of the polysulfone are included, and thus may have limited use as a solid adhesive part, which may be exposed to elevated temperatures during shipping and storage (e.g., due to tackiness of the part). In some compositions, the thermoplastic includes functional groups that may react with an epoxy group over time and limit the shelf life stability of the composition. Additionally, some compositions are employed in composite applications with large amounts of fiber reinforcement which provide for stiffness at elevated temperature. However, processing of the adhesive composition (such as by extrusion or injection molding) is generally not possible after impregnating the fibers.

There continues to exist a need for polymeric adhesive compositions for adhering metal components for use in high temperature environments. There is also a need for such polymeric adhesive compositions that can be extruded, molded, or otherwise formed in a part shaping machine prior to curing of the composition. There is also a need for polymeric adhesive compositions which after curing have generally high tensile strength at elevated temperature (e.g., a generally high ratio of tensile strength at elevated temperature to a tensile strength at room temperature). There is also a need for compositions that have good shelf life stability (e.g., prior to shaping into parts and/or prior to activating by curing and/or expanding). There is also a need for a polymeric adhesive composition which can be expanded during the curing of the composition.

SUMMARY

One aspect of the teachings herein is directed at a polymeric adhesive composition (i.e., an activatable material) for molding or extruding an article comprising one or more epoxy resins (e.g., present in an amount of about 25 weight percent or more and/or about 85 weight percent or less, based on the total weight of the polymeric adhesive composition); about 7 to about 45 weight percent of one or more high temperature thermoplastic polymers (based on the total weight of the polymeric adhesive composition) having a glass transition temperature of about 175° C. or more; about 0.5 to about 20 weight percent of one or more impact modifiers (e.g., present as an elastomeric polymer core in a core/shell polymer); one or more curatives for curing the epoxy resin(s) (e.g., in an amount from about 0.4 to about 15 weight percent, based on the total weight of the polymeric adhesive composition); and optionally up to 40 weight percent of one or more fillers; and optionally up to about 7 weight percent (e.g., from about 0.1 to about 4 weight percent) of one or more blowing agents; wherein the one or more epoxy resins includes one or more solid epoxy resins and one or more liquid epoxy resins, wherein the concentration of the solid epoxy resin is sufficiently high so that the polymeric adhesive composition is a solid at room temperature (e.g., the polymeric adhesive composition has a tensile modulus of about 20 MPa or more, as measured according to ISO 527 at about 23° C.).

Another aspect of the teachings is directed at a pre-cure article including a polymeric adhesive composition according to the teachings herein including one or more high glass transition temperature thermoplastic resins and one or more epoxy resins.

Another aspect of the teachings is directed at a polymeric adhesive composition for molding or extruding an article comprising: about 35 to about 65 weight percent of one or more epoxy resins, including a solid unmodified bisphenol-A based epoxy resin having an epoxide equivalent weight of about 800 g/equivalent or more as measured according to ISO 3001, an epoxy cresol novolac resin having a functionality of about 3.5 or more, and a liquid epoxy phenol novolac resin having an epoxy equivalent weight of about 150 to about 300 g/equivalent as measured according to ISO 3001; about 12 to about 30 weight percent or more of one or more thermoplastic polysulfones having a glass transition temperature of about 175° C. or more; about 1 to about 15 weight percent of one or more impact modifiers (e.g., an impact modifier that is includes, consists essentially of, or consists entirely of a elastomeric polymer core of a core/shell polymer); about 2 to about 9 weight percent of one or more curatives for curing the epoxy resin(s), wherein the one or more curatives includes a substituted urea; about 5 to about 25 weight percent of one or more fillers selected from the group consisting of calcium carbonate, clay, and silica; about 0.1 to about 3 weight percent rheology modifier (i.e., an organic or inorganic component that increases the viscosity of the activatable material, even when used at concentrations of about 3 weight percent or less), and about 0.1 to about 3 weight percent of one or more blowing agents; wherein the one or more epoxy resins includes one or more solid epoxy resins and one or more liquid epoxy resins, wherein the concentration of the solid epoxy resin is sufficiently high so that the polymeric adhesive composition is a solid at room temperature (e.g., the polymeric adhesive composition has a tensile modulus at room temperature of about 20 MPa or more, as measured according to ISO 527). The rheology modifier may be an organic or an inorganic material. The rheology modifier preferably is a plate shaped or fiber shaped material having an aspect ratio of about 3 or more, preferably about 5 or more, and more preferably about 10 or more. An example of an organic rheology modifier is a polymeric fiber that remains a solid at typical use temperatures and preferably remains a solid at typical processing temperatures. The organic rheology modifier may include, consist essentially of, or consist entirely of polyaramid fibers (e.g., para-aramid fibers, such as KEVLAR® fibers). Preferred fibers for the rheology modifier have an average length of about 50 mm or less (e.g., about 35 mm or less);

Another aspect of the teachings relates to a device including a first substrate (e.g., a metallic substrate) attached to a second substrate (e.g., a metallic substrate), wherein the first substrate and the second substrate are directly attached by a polymeric adhesive component. The polymeric adhesive component may be formed from a polymeric adhesive composition including a blend of at least one or more solid epoxy resins and at least one or more high glass transition temperature thermoplastic polymers having a glass transition temperature of about 175° C. or more. Preferably, the polymeric adhesive composition is a polymeric adhesive composition according to the teachings herein. The polymeric adhesive component may be formed by heating and curing the polymeric adhesive composition.

BRIEF DESCRIPTION OF DRAWINGS

FIG. 1A illustrates the geometry before expanding the activatable material, and FIG. 1B illustrates the geometry after expanding the activatable material (and trimming off any excess material).

DETAILED DESCRIPTION

Figure 1A:
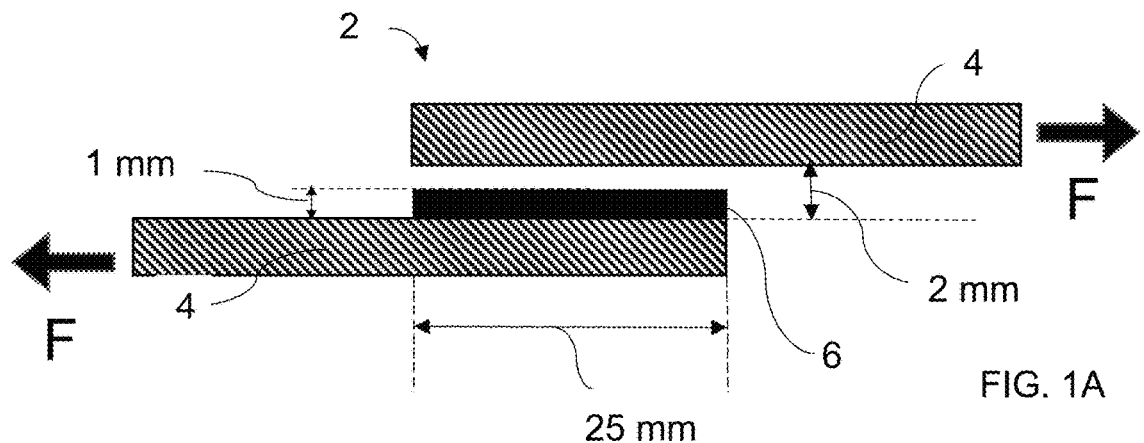
FIGS. 1A and 1B are drawings of an illustrative lap shear test specimen for testing an activatable material including a blowing agent.

The polymeric adhesive compositions according to the teachings herein are activatable materials, and includes one or more ingredients capable of polymerizing and/or cross-linking when heated. Additionally, the activatable materials typically bonds to substrates upon being heated. The activatable material may also be capable of expanding upon heating. Preferably the bond is a durable bond that is maintained after exposure to heat, environmental conditions, and/or mechanical forces, such as expected during use.

Unless otherwise specified, the term "consists substantially of" refers to a concentration of about 80 to 100 percent by weight, preferably about 90 to 100 percent by weight, more preferably from 95 to 100 percent by weight, even more preferably from 98 to 100 percent by weight, and most preferably from 99.2 to 100 percent by weight.

The polymeric adhesive composition should be a solid material at ambient conditions. For example, the polymeric adhesive composition (i.e., in the uncured state) may have a tensile modulus of about 20 MPa or more, preferably about 50 MPa or more, more preferably about 100 MPa or more, and most preferably about 200 MPa or more, as measured according to ISO 527 at 23° C. (and preferably at about 50° C.). The polymeric adhesive composition may have a tensile modulus of about 1000 MPa or less, about 600 MPa or less, or about 450 MPa or less, as measured according to ISO 527 at 23° C.

The polymeric adhesive compositions herein preferably are capable of being formed into pellets or other particles and stored as pellets without agglomeration. The pellets or other particles may later be fed into a part shaping machine such as an extruder or an injection molding machine. The particles may be applied to a surface using a spraying device.

High Glass Transition Temperature Thermoplastic Polymer

The high glass transition temperature thermoplastic polymer may include any thermoplastic polymer having a glass transition temperature of about 175° C. or more. The high glass transition temperature thermoplastic polymer may include one or more thermoplastic polymers selected from the group consisting of polysulfone, polyester sulfone, polyphenyl sulfone, polyetheretherketone, polyetherimide, copolymers thereof, and combinations thereof. Preferably the high glass transition temperature thermoplastic polymer includes a polysulfone homopolymer and/or a polysulfone copolymer. Preferred polysulfone homopolymers consist substantially of (e.g., about 99 weight percent or more, about 99.5 weight percent or more, about 99.6 weight percent or more, or about 100 weight percent), or entirely of a monomer repeat unit having one or more sulfone linkages. Preferred polysulfone copolymers include a first monomer repeat unit having one or more sulfone linkages, and one or more second monomers. Preferable monomer repeat units having a sulfone linkage include a bisphenol A polysulfone repeat units (formula 1), a polyester sulfone repeat unit, a polyphenylene sulfone repeat unit, a polyether sulfone repeat unit, a polyphenylene ether sulfone repeat unit, or any combination thereof. The monomer repeat unit including a sulfone linkage (for example the bisphenol A polysulfone repeat unit) may be present at a concentration of about 60 weight percent or more, about 75 weight percent or more, about 90 weight percent or more, about 95 weight percent or more, or about 97 weight percent or more, based on the total weight of the polysulfone copolymer. The concentration of the first monomer repeat unit (e.g., bisphenol A polysulfone repeat units) in the polysulfone copolymer may be about 99 weight percent or less, or about 98 weight percent or less, based on the total weight of the copolymer.

The high glass transition temperature thermoplastic polymer may have a glass transition temperature (e.g., as measured according to differential scanning calorimetry at a heating rate of about 10° C./min) of about 175° C. or more, preferably about 180° C. or more, even more preferably about 185° C. or more, and most preferably about 190° C. or more. The high glass transition temperature thermoplastic polymer may have a glass transition temperature of about 280° C. or less, preferably about 250° C. or less, even more preferably about 240° C. or less, and most preferably about 225° C. or less. For example, the high glass transition temperature thermoplastic polymer may have a glass transition temperature from about 175° C. to about 280° C., from about 175° C. to about 225° C., from about 185° C. to about 280° C., or from about 185° C. to about 225° C.

Although the polysulfone may be a functionalized polysulfone (e.g., having an end group, such as an amine group capable of reacting with an epoxy resin), it is preferred that some or all of the polysulfone polymer molecules are free of such functionalized groups. Preferably, the concentration of polysulfone polymer molecules having at least one amine end group may be about 50 weight percent or less, about 20 weight percent or less, about 10 weight percent or less, about 5 weight percent or less, about 2 weight percent or less or about 1 weight percent or less, based on the total weight of the polysulfone. The concentration of the polysulfone polymer molecules having at least one amine end group may be about 0 weight percent or more. For example, the polymeric adhesive compositions according to the teachings herein may be substantially free of or entirely free of block copolymers including a polysulfone molecule grafted with an epoxy molecule.

Preferably, some or all of the monomer repeat units of the polysulfone includes an ether linkage.

The polysulfone preferably has no amine groups or other nitrogen atoms (e.g., terminal amine groups or otherwise) that can react with an epoxy group.

The monomer repeat unit including a sulfone linkage may be a bisphenol A polysulfone repeat unit (or a derivative thereof), such as a monomer repeat unit shown in Formula 1:

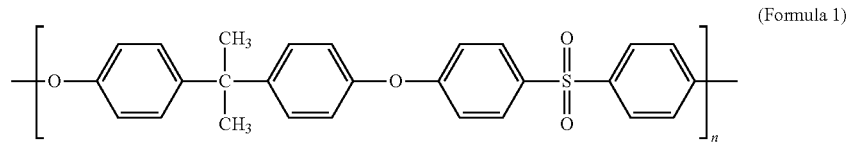

(Formula 1)

The monomer repeat unit including a sulfone linkage may be a polyester sulfone repeat unit (or a derivative thereof, such as a monomer repeat unit shown in Formula 2).

$$—[—O-Ph-SO_2—O-Ph-]—$$ (Formula 2)

The monomer repeat unit including a sulfone linkage may be a polyphenylene sulfone repeat unit (or a derivative thereof), such as a monomer repeat unit shown in Formula 3.

$$—[-Ph-SO_2—]—$$ (Formula 3)

The monomer repeat unit including a sulfone linkage may be a polyether sulfone repeat unit (or a derivative thereof), such as a monomer repeat unit shown in Formula 4 (e.g., POLYETHER SULFON Sulfon 200P™ commercially available from IMPERIAL CHEMICAL INDUSTRIES).

$$—[-Ph-SO_2-Ph-O—]—$$ (Formula 4)

The monomer repeat unit including a sulfone linkage may have the structure as shown in Formula 5 (or a derivative thereof).

$$—[—O—C(O)-Ph(CH_3)—C(O)—O-Ph-O-Ph-SO_2-Ph-O-Ph(CH_3—)—]—$$ (Formula 5)

The monomer repeat unit including a sulfone linkage may be a polyphenylene ether sulfone repeat unit (or a derivative thereof), such as a monomer repeat unit shown in Formula 6.

$$—[-Ph-Ph-O-Ph(R)_x—SO_2-Ph(R)_x—O—]—$$ (Formula 6)

x is 0, 1, 2, 3, or 4; and each R is H, alkyl, aryl, akyl aryl, alkoxy, halogen, or any combination thereof.

As used herein, a derivative of the monomer repeat unit includes a structure where one or more Ph units is substituted with $Ph(R)_xT$, where x is 0, 1, 2, 3, or 4; and each R is independently H, alkyl, aryl, alkyl aryl, alkoxy, halogen, or a combination thereof.

The monomer repeat unit of the polysulfone polymer may include one or more sulfone linkages, and optionally one or more linkages selected from the group consisting of one or more ester linkages, one or more phenyl linkages, and one or more isopropylene linkages. For example, the monomer repeat unit may include two aryl sulfone linkages.

High glass transition temperature polymer (e.g., polysulfone) properties:

The high glass transition temperature polymer (e.g., polysulfone) preferably has a viscosity in the molten or liquid state (e.g., at about 343° C.) sufficient for mixing the polymer with at least a portion of the filler, at least a portion of the epoxy resin, or both. For example, the melt flow rate (in units of g/10 min as measured according to ASTMD D1238 at 343° C./2.16 kg) of the high glass temperature thermoplastic polymer may be about 0.5 or more, preferably about 1 or more, even more preferably about 2 or more, and most preferably about 3 or more. The melt flow rate of the high glass transition temperature polymer should be sufficiently low so that the polymer and/or the activatable material has good mechanical properties (e.g., at elevated temperatures). The melt flow rate (in units of g/10 min as measured according to ASTMD D1238 at 343° C./2.16 kg) of the high glass transition temperature thermoplastic polymer preferably is about 500 or less, more preferably about 100 or less, even more preferably about 55 or less, even more preferably about 38 or less, and most preferably about 25 or less.

The activatable material preferably includes the high glass transition temperature thermoplastic polymer in an amount sufficient so that the tensile modulus decreases by less than about 50% upon heating the cured material (e.g., cured at 175° C. for 30 minutes) from about 23° C. to about 150° C. and/or from about 23° C. to about 170° C. Preferably the high glass transition temperature thermoplastic polymer is present in an amount of about 5 weight percent or more, more preferably about 7 weight percent or more, even more preferably about 10 weight percent or more, even more preferably about 12 weight percent or more, and most preferably about 14 weight percent or more, based on the total weight of the polymeric adhesive composition. High glass transition temperature thermoplastic polymers, such as polysulfones, are difficult to process and/or degrade at high processing temperatures. The polymeric adhesive composition preferably includes about 50 weight percent or less of the high glass transition temperature thermoplastic polymers (e.g., the polysulfone), more preferably about 45 weight percent or less, even more preferably about 40 weight percent or less, even more preferably about 35 weight percent or less, and most preferably about 30 weight percent or less, based on the total weight of the polymeric adhesive composition.

The polymeric adhesive compositions according to the teaching herein include one or more epoxy resins for providing a durable adhesion to substrate after curing.

Epoxy resin is used herein to mean any of the conventional dimeric, oligomeric or polymeric epoxy materials containing at least one epoxy functional group. Moreover, the term epoxy resin can be used to denote one epoxy resin or a combination of multiple epoxy resins. The polymer-based materials may be epoxy-containing materials having one or more oxirane rings polymerizable by a ring opening reaction. In preferred embodiments, the polymeric adhesive composition includes up to about 85 weight % or more of an epoxy resin. The total amount of the epoxy resin(s) may be about 85 weight % or less, about 80 weigh percent or less, about 75 weight percent or less, about 70 weight percent or less, about 65 weight percent or less, or about 60 weight percent or less, preferably based on the total amount of polymer in the polymeric adhesive composition, and more preferably based on the total weight of the polymeric adhesive composition. The total amount of the epoxy resin(s) may be about 20 weight percent or more, about 25 weight percent or more, about 30 weight percent or more, about 35 weight percent or more, or about 40 weight percent or more, preferably based on the total weight of the polymeric adhesive composition, and more preferably based on the total weight of the polymer in the polymeric adhesive composition. For example, the activatable material may include between about 20% and about 85% by weight epoxy resin, between about 25% and about 85% by weight epoxy resin, between about 30% and about 70 percent by weight, or between about 30% and even more preferably between about 30% and 60% by weight epoxy resin, based on the total weight of the activatable material. Of course, amounts of epoxy resin may be greater or lower depending upon the intended application of the activatable material. As an example, it is contemplated that weight percentages may be lower or higher when other ingredients such as the adduct, filler, alternative polymers, combinations thereof or the like are used in greater or lesser weight percentages.

The epoxy may be aliphatic, cycloaliphatic, aromatic or the like. The epoxy may be supplied as a solid (e.g., as pellets, chunks, pieces or the like) or a liquid (e.g., an epoxy resin). As used herein, unless otherwise stated, a resin is a solid resin if it is solid at a temperature of 23° C. and is a liquid resin if it a liquid at 23° C. The epoxy resin is added to the activatable material to increase the adhesion, flow properties or both of the material. The epoxy may include a copolymer including two or more monomers, or a terpolymer including three or more monomers. As a homopolymer, a copolymer or a terpolymer, the epoxy may include monomers with high chemical reactivity and that are capable of linking up with similar molecules, resulting in an increase in chain length and/or grafting and/or crosslinking. Typically the epoxy resin has a functionality of two or more, including a first reactive site spaced apart from a second reactive site (e.g., at different end of the chain). The functionality of the epoxy resin typically is about 10 or less, however, higher functionality may be employed. Preferably at least a portion of the epoxy resin includes a multifunctional epoxy resin (i.e., having a functionality of greater than 2). The multifunctional epoxy resin preferably may have a functionality of about 2.2 or more, about 2.5 or more, about 3 or more, about 3.5 or more, or about 4 or more. The multifunctional epoxy resin preferably is present in the activatable material at a concentration of about 20 weight percent or more, more preferably about 40, even more preferably about 50 weight percent or more, and most preferably about 55 weight percent or more, based on the total weight of the one or more epoxy resins in the activatable material. The amount of multifunctional epoxy resin in the activatable material may be about 100 weight percent or less, preferably about 95 weight percent or less, more preferably about 90 weight percent or less, even more preferably about 85 weight percent or less, and most preferably about 80 weight percent or less, based on the total weight of the one or more epoxy resins. One exemplary epoxy resin may be a phenolic resin, which may be a novolac type or other type resin. For example, the multi-functional epoxy resin may include, consist substantially of, or consist entirely of one or more epoxy cresol novolac resins and/or one or more epoxy phenol novolac resins. Another preferred epoxy resin is a bisphenol-F epoxy resin. Other preferred epoxy containing materials may include a bisphenol-A epichlorohydrin ether polymer, or a bisphenol-A epoxy resin which may be modified with butadiene or another polymeric additive. Moreover, various mixtures of several different epoxy resins may be employed as well. Examples of suitable epoxy resins are sold under the tradenames ARALDITE® (e.g., CT 6060, GT 6097, ECN 9699, and EPN 9850), commercially available from Huntsman Corporation, EPALLOY™ (e.g., 8250), commercially available from CVC Thermoset Specialties, and DER® (e.g., DER 331, DER 661, DER 662), commercially available from the Dow Chemical Company, Midland, Michigan.

Preferably the polymeric adhesive composition includes one or more liquid epoxy resins and one or more solid epoxy resins.

The amount of the liquid epoxy resin may be sufficient so that the high glass transition temperature thermoplastic can be easily compounded in an extruder. For example, the weight ratio of the liquid epoxy resin to the high glass transition temperature thermoplastic resin (e.g., a polysulfone according to the teachings herein) may be about 0.4 or more, about 0.7 or more, about 1.0 or more, about 1.3 or more, or about 1.6 or more. If the amount of liquid epoxy resin is too high, the activatable material may be difficult to handle (e.g., the activatable material may become tacky or even flow at room temperature). The ratio of the liquid epoxy resin to the high glass transition temperature thermoplastic resin preferably is about 7 or less, more preferably about 5 or less, and more preferably about 4 or less. Preferably the liquid epoxy resin is present in the activatable material in an amount of about 65 weight percent or less, more preferably about 60 weight percent or less, even more preferably about 55 weight percent or less, and most preferably about 50 weight percent or less, based on the total weight of the polymer in the composition (e.g., based on the total weight of the epoxy resin, the high temperature thermoplastic resin, and any core/shell polymer). Preferably the liquid epoxy resin includes or consists substantially of, or consists entirely of one or more multi-functional epoxy resins. For example, the liquid may include one or more epoxy phenol novolac resins and/or one or more epoxy cresol novolac resins. Preferably the amount of multi-function liquid epoxy resin (e.g., having functionality of about 2.1 or more, 2.3 or more, 2.5 or more, or 3.0 or more) is about 30 weight percent or more, more preferably about 50 weight percent or more, even more preferably about 70 weight percent or more, and most preferably about 80 weight percent or more, based on the total weight of the one or more liquid epoxy resins. Preferably the liquid epoxy resin is present in the activatable material at a concentration of about 63 weight percent or less, more preferably about 56 weight percent or less, even more preferably about 52 weight percent or less, and most preferably about 45 weight percent or less, based on the total weight of the activatable material. Preferably the liquid epoxy resin is present in the activatable material at a concentration of about 5 weight percent or more, more preferably about 10 weight percent or more, even more preferably about 20 weight percent or more, and most preferably about 26 weight percent or more, based on the total weight of the activatable material.

The amount of the solid epoxy resin in the polymeric adhesive composition should be sufficient so that the composition is a solid at room temperature. The solid epoxy resin also may contribute to the high temperature performance of the composition after curing, as discussed herein. Preferably the solid epoxy resin is present at about 4 weight percent or more, more preferably about 6 weight percent or more, even more preferably about 8 weight percent or more, and most preferably about 10 weight percent or more, based on the total weight of the activatable material. The weight ratio of the solid epoxy resin to the liquid epoxy resin may be about 0.00 or more, about 0.05 or more, about 0.10 or more, about 0.15 or more, about 0.2 or more, or about 0.25 or more. The weight ratio of the solid epoxy resin to the liquid epoxy resin preferably is about 1.0 or less, about 0.8 or less, about 0.6 or less, or about 0.5 or less. The solid epoxy resin may include any chemical structure as described herein (e.g., homopolymer, copolymer, terpolymer, bisphenol-A, bisphenol-F, epoxy phenol novolac resin, epoxy cresol novolac resin etc.). Preferably the solid epoxy resin includes, consists substantially of, or consists essentially of bisphenol-F epoxy resins. Solid epoxy resins may be characterized by molecular weight as a type 3, type 4, type 5, type 6, type 7, type 8, type 9, or type 10 epoxy resin. Preferred solid epoxy resins are type 4 or higher, more preferably type 5 or higher, even more preferably type 6 or higher, and most preferably type 7 or higher. Preferred solid epoxy resins are type 10 or lower, more preferably type 9 or lower, and most preferably type 8 or lower.

Impact Modifier

Generally, it is preferable for the polymeric adhesive composition to include at least one impact modifier. As used herein, like with any other ingredients of the present invention, the term "impact modifier" can include one impact modifier or plural impact modifiers. Various impact modifiers may be employed in the practice of the present invention and often include one or more elastomers. It is generally preferable for the impact modifier to be about 0.5 weight percent or more, more preferably about 1 weight % or more, even more preferably about 1.5 weight percent or more, even more preferably about 2 weight percent or more, even more preferably about 2.5 weight percent or more, and most preferably about 3.0 weight percent or more of the activatable material. The impact modifier preferably is present in an amount of about 20 weight % or less, more preferably about 16 weight percent or less, even more preferably about 15 weight percent or less, even more preferably about 9% by weight or less, and most preferably about 7 weight percent or less, based on the total weight of the activatable material. Higher or lower amounts may be used in particular embodiments.

In one embodiment of the present invention, the impact modifier includes at least one core/shell impact modifier and preferably the impact modifier includes a substantial portion of core/shell impact modifier. In one preferred embodiment, the impact modifier is comprised of at least 60%, more typically at least 80% and even more typically at least 97% core/shell impact modifier. As used herein, the term core/shell impact modifier denotes an impact modifier wherein a substantial portion (e.g., about 30 weight % or more, about 50 weight % or more, or about 70 weight % or more) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers (or polymer blocks) that are combined and/or reacted together (e.g., sequentially polymerized) or may be part of separate or same core/shell systems.

The first and second polymeric materials of the core/shell impact modifier can include elastomers, polymers, thermoplastics, copolymers, other components, combinations thereof or the like. In preferred embodiments, the first polymeric material, the second polymeric material or both of the core/shell impact modifier include or are substantially entirely composed of (e.g., at least 70%, 80%, 90% or more by weight) one or more thermoplastics and/or one or more elastomers. The core/shell impact modifier most preferably includes one or more thermoplastics and one or more elastomers. Exemplary thermoplastics include, without limitation, styrenics, acrylonitriles, acrylates, acetates, polyamides, polyethylenes or the like.

The core/shell impact modifier may be prepared in an emulsion. For example, the core, the shell, or both may be prepared in an emulsion. After preparing the core/shell impact modifier, the core/shell impact modifier may be removed from the emulsion. In one approach, a matrix fluid of the emulsion is replaced with a replacement fluids (such as a polymeric resin, a polymerizable monomer, or a polymerizable prepolymer). For example, some or all of the matrix fluid of the emulsion may be replaced with an epoxy resin (e.g., a liquid epoxy resin). The process may include a step of removing some or all of the original matrix fluid. Preferably, agglomeration of the core/shell polymer is avoided during the fluid exchange. The resulting core/shell impact modifier in the replacement fluid preferably has a sufficient amount of the replacement fluid so that agglomeration is reduced, minimized, or entirely avoided. Preferably, some or all of the surfactant (i.e., from the emulsion) may be removed during the replacement of the matrix fluid with the replacement fluid. This may be particularly beneficial when it is required to have improved adhesion and/or improved mechanical properties after heat aging, or after humidity aging, or after other environmental aging. The core/shell impact modifiers may be formed by emulsion polymerization followed by coagulation or spray drying. Here, it may be necessary to de-agglomerate the core/shell impact modifier before, during, or after preparing the composition. The impact modifier preferably is formed of or at least include a core/shell graft co-polymer. The first or core polymeric material of the graft copolymer preferably has a glass transition temperature substantially below (i.e., at least 10, 20, 40 or more degrees centigrade) the glass transition temperature of the second or shell polymeric material. Moreover, it may be desirable for the glass transition temperature of the first or core polymeric material to be below 23° C. while the glass temperature of the second or shell polymeric material to be above 23° C., although not required.

Examples of useful core/shell graft copolymers are those where relatively hard polymers or polymer blocks (e.g., polymers or polymer blocks including, consisting substantially of, or consisting entirely of styrene, acrylonitrile or methyl methacrylate) are grafted onto a polymeric core made from a relatively soft polymer (e.g., an elastomer or elastomeric containing polymer or polymer block such as butadiene or butyl acrylate). The relative hardness of the polymers may be determined by flexural modulus (e.g. as measured according to ASTM D790), for example on the individual polymers or isolated polymer blocks. U.S. Pat. No. 3,985,703, which is herein incorporated by reference, describes useful core/shell polymers, the cores of which are made from butyl acrylate but can be based on ethyl isobutyl, 2-ethylhexel or other alkyl acrylates or mixtures thereof. The core polymer, may also include other copolymerizable compounds, such as compounds containing or consisting of styrene, vinyl acetate, methyl methacrylate, butadiene, isoprene, derivatives thereof, or any combination thereof. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion may be polymerized from methyl methacrylate and optionally other alkyl methacrylates, such as ethyl, butyl, or mixtures thereof methacrylates. Up to 40 percent by weight or more of the shell monomers may be styrene, vinyl acetate, vinyl chloride, and the like. Additional core/shell graft copolymers useful in embodiments of the present invention are described in U.S. Pat. Nos. 3,984, 497; 4,096,202; 4,034,013; 3,944,631; 4,306,040; 4,495, 324; 4,304,709; and 4,536,436, the entireties of which are herein incorporated by reference. Examples of core/shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core/shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

The impact modifier preferably is provided as core/shell particles. In a core/shell particle (e.g., having an elastomeric core), the concentration of the impact modifier typically refers to the amount of the core portion. The impact modifier preferably is provided as a particle dispersion including the core/shell particles dispersed in a matrix material and most preferably a carrier liquid Preferred matrix materials have a melting temperature of about 90° C. or less and more preferably about 60° C. or less, and preferred carrier liquids have a melting temperature of about 20° C. or less, about 10° C. or less, or about 5° C. or less. Preferably, the carrier liquid is a liquid epoxy resin, such as a liquid epoxy resin having properties and/or structure as described herein. The amount of the matrix material (e.g., the carrier liquid) preferably is about 25 weight percent or more, more preferably about 50 weight percent or more, and most preferably about 60 weight percent or more, based on the total weight of the dispersion (i.e., including the matrix material and the particles). The amount of the matrix material (e.g., the carrier liquid) preferably is about 95 weight percent or less (although higher amounts may be employed), more preferably about 90 weight percent or less, and most preferably about 85 weight percent or less, based on the total weight of the dispersion. Preferably, the carrier liquid includes, consists substantially of, or consists entirely of a liquid novolac resin, a liquid bisphenol-A epoxy resin, a liquid bisphenol-F epoxy resin, or any combination thereof. The dispersion particles preferably have a diameter of about 25 nm or more, more preferably about 50 nm or more, even more preferably about 75 nm or more, and most preferably about 100 nm or more. The dispersion particles preferably have a diameter of about 10 µm or less, more preferably about 2 µm or less, even more preferably about 900 nm or less, even more preferably about 600 nm or less, and most preferably about 400 nm or less.

Examples of useful impact modifiers include, but are not limited to those sold under the tradename, Kane ACE™, commercially available from Kaneka Corporation (Japan), and PARALOID, commercially available from Rohm & Haas Co. One particularly preferred grade of PARALOID impact modifier is polymethyl methacrylate shell and MBS core modifier sold under the designation EXL-2691A. One particularly preferred grade of Kane ACE impact modifier is a core/shell dispersion including about 37 weight percent core/shell particles having a polybutadiene rubber core dispersed in a liquid bisphenol-F carrier liquid. This grade has core/shell particles including about 80 to about 90 weight percent core and about 10 to about 20 weight percent shell.

While it is contemplated that various polymer/elastomer adducts may be employed according to the present invention, one preferred adduct is an epoxy/elastomer adduct. Preferably, an elastomer-containing adduct is employed in the activatable material of the present invention. The epoxy/elastomer hybrid or adduct may be included in an amount of up to about 30% by weight of the activatable material. If present, the adduct (e.g., the elastomer-containing adduct) preferably is approximately about 0.1 weight percent or more of the activatable material. The adduct (e.g., the elastomer-containing adduct) preferably is approximately 20 weight percent or less, more preferably about 10 weight percent or less, and most preferably about 4 weight percent or less of the activatable material. Of course, the elastomer-containing adduct may be a combination of two or more particular adducts and the adducts may be solid adducts or liquid adducts at a temperature of 23° C. or may also be combinations thereof. In one preferred embodiment, the activatable composition is substantially or entire free of a polymer/elastomer adduct.

The activatable material may optionally include one or more additional polymers (e.g., homopolymers or copolymers), which can include a variety of different polymers, such as thermoplastics, elastomers, plastomers combinations thereof or the like. For example, and without limitation, polymers that might be appropriately incorporated into the polymeric admixture include halogenated polymers, polycarbonates, polyketones, urethanes, polyesters, silanes, allyls, olefins, styrenes, acrylates, methacrylates, epoxies, silicones, phenolics, rubbers, polyphenylene oxides, terephthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate. If employed, any such additional polymers or copolymers preferably are present (in total) at a concentration of about 10 weight percent or less, based on the total weight of the polymer in the composition, and preferably at a concentration of about 5 weight percent or less (more preferably about 1.5 weight percent or less, and most preferably about 0.5 weight percent or less) based on the total weight of the activatable material. If present, the one or more additional polymers (each or in total) may be about 0.1 weight percent or more of the weight of the activatable composition.

The thermoplastic polyethers typically include pendant hydroxyl moieties. The thermoplastic polyethers may also include aromatic ether/amine repeating units in their backbones. The thermoplastic polyethers of the present invention preferably have a melt index between about 5 and about 100, more preferably between about 25 and about 75 and even more preferably between about 40 and about 60 grams per 10 minutes measured using 2.16 kg mass at a temperature of about 190° C. Of course, the thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like. The thermoplastic polyether preferably has a glass transition temperature of about 180° C. or less, about 140° C. or less, or about 100° C. or less. The thermoplastic polyether preferably has a glass transition temperature of about 30° C. or more, about 40° C. or more, or about 50° C. The glass transition temperature may be measured by dynamic mechanical analysis (see e.g., ISO 6721-11:2012).

Preferably, the thermoplastic polyethers are formed by reacting an amine with an average functionality of 2 or less (e.g., a difunctional amine) with a glycidyl ether (e.g., a diglycidyl ether). As used herein, the term difunctional amine refers to an amine with an average of two reactive groups (e.g., reactive hydrogens).

According to one embodiment, the thermoplastic polyether is formed by reacting a primary amine, a bis (secondary) diamine, a cyclic diamine, a combination thereof or the like (e.g., monoethanolamine) with a diglycidyl ether or by reacting an amine with an epoxy-functionalized poly(alkylene oxide) to form a poly(amino ether). According to another embodiment, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine. Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed. Examples of preferred thermoplastic polyethers and their methods of formation are disclosed in U.S. Pat. Nos. 5,275,853; 5,464,924 and 5,962,093, which are incorporated herein by reference for all purposes. Advantageously, the thermoplastic polyethers can provide the activatable material with various desirable characteristics such as desirable physical and chemical properties for a wide variety of applications as is further described herein.

Blowing Agent

One or more blowing agents may be added to the activatable material for producing inert gasses that form, as desired, an open and/or closed cellular structure within the activatable material and/or for adhering two substrates that are separated by a gap (e.g., by compensating for gap variations). In this manner, it may be possible to lower the density of articles fabricated from the material. In addition, the material expansion can help to improve adhesion capability.

The blowing agent may include one or more nitrogen containing groups such as amides, amines and the like. Examples of suitable blowing agents include azodicarbonamide, dinitrosopentamethylenetetramine, 4,4$_i$-oxy-bis-(benzenesulphonylhydrazide), trihydrazinotriazine and N, N$_i$-dimethyl-N,N$_i$-dinitrosoterephthalamide.

An accelerator for the blowing agents may also be provided in the activatable material. Various accelerators may be used to increase the rate at which the blowing agents forms gasses (e.g., inert gasses) and/or decrease the temperature at which the blowing agent forms the gasses. One preferred blowing agent accelerator is a metal salt, or is an oxide, e.g. a metal oxide, such as zinc oxide. Other preferred accelerators include modified and unmodified thiazoles or imidazoles.

Amounts of blowing agents and blowing agent accelerators can vary widely within the activatable material depending upon the type of cellular structure desired, the desired amount of expansion of the activatable material, the desired rate of expansion and the like. If employed, exemplary ranges for the amounts of blowing agents and blowing agent accelerators in the activatable material range from about 0.001% by weight to about 7% by weight and may even be in the activatable material in fractions of weight percentages. For example, the amount of the blowing agent may be about 7 weight percent or less, about 4 weight percent, about 3 weight percent or less, or about 2 weight percent or less, based on the total weight of the activatable material. If employed in the activatable material, the blowing agent is preferably present in an amount of about 0.001 weight percent or more, more preferably about 0.01 weight percent or more, even more preferably about 0.1 weight percent or more, and most preferably about 0.4 weight percent or more, based on the total weight of the activatable material.

Curing Agent

One or more curing agents and/or curing agent accelerators may be added to the activatable material. Amounts of curing agents and curing agent accelerators can, like the blowing agents, vary widely within the activatable material depending upon the type of cellular structure desired, the desired amount of expansion of the activatable material, the desired rate of expansion, the structure (e.g., molecular weight, chemical structure, and functionality) of the epoxy resins, the desired structural properties of the activatable material and the like. Exemplary ranges for the curing agents or curing agent accelerators present in the activatable material range from about 0.001% by weight to about 20% by weight. For example, the curing agent, the curing agent accelerators, or the total of the curing agent and the curing agent accelerators may be present in an amount of i) about 0.01 weight % or more, about 0.1 weight percent or more, about 0.4 weight percent or more, about 0.8 weight percent or more, about 1.4 weight percent or more, or about 2.0 weight percent or more and/or ii) about 18 weight percent or less, about 15 weight percent or less, about 12 weight percent or less, or about 9 weight percent or less, based on the total weight of the activatable material.

Preferably, the curing agents assist the activatable material in curing by crosslinking of the polymers, epoxy resins or both. It is also preferable for the curing agents to assist in thermosetting the activatable material. Useful classes of curing agents are materials selected from aliphatic or aromatic amines or their respective adducts, amidoamines, polyamides, cycloaliphatic amines, anhydrides, polycarboxylic polyesters, isocyanates, or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the activatable material.

The present invention contemplates the omission of a blowing agent and a curing agent. Preferably, however, the curing agent, the blowing agent or both are present in the activatable material and thermally activated. Alternatively, other agents may be employed for realizing activation by other means, such as moisture, radiation, or otherwise.

Filler

The activatable material may also include one or more fillers, including but not limited to particulated materials (e.g., powder), beads, microspheres, or the like. Preferably the filler includes a material that is generally non-reactive with the other components present in the activatable material. While the fillers may generally be present within the activatable material to take up space at a relatively low weight and/or a relatively low cost, it is contemplated that the fillers may also impart one or more properties (e.g., leveling, strength, or impact resistance) to the activatable material.

Examples of fillers include silica, diatomaceous earth, glass, clay (e.g., including nanoclay), talc, pigments, colorants, glass beads or bubbles, glass, carbon or ceramic fibers, polymeric fibers such as nylon or polyaramid fibers (e.g., KEVLAR® fibers), and the like. Such fillers, particularly clays, may assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers.

When employed, the fillers in the activatable material may be present in an amount of about 0.1 weight percent or more, about 5 weight percent or more, about 20 weight percent or more, or about 30 weight percent or more, based on the total weigh of the activatable material. Preferably, the filler is present in an amount of about 70 weight percent or less, more preferably about 55 weight percent or less, even more preferably about 50 weight percent or less, even more preferably about 40 weight percent or less, and most preferably about 25 weight percent or less, based on the total weight of the activatable material. For example, the filler may be present in a range from 5 weight % to 60 weight % of the activatable material, or from about 10 to 55% by weight of the activatable material. It will be appreciated that the activatable material may be substantially free of clay and/or other phyllosilicates. For example, the activatable material may include from about 0% to about 3% by weight, and more preferably less than 1% by weight of clay and/or other phyllosilicates. The filler may be present as powder particles. Such powder particles preferably have a mean particle diameter of about 0.01 μm or more, more preferably about 0.1 μm or more, and most preferably about 1 μm or more. The powder particles preferably have a mean particle diameter of about 80 μm or less, more preferably about 50 μm or less, even more preferably about 25 μm or less, and most preferably about 15 μm or less. The amount of the powdered mineral type filler in the activatable material preferably is from about 1% to about 40% by weight, more preferably from about 5% to about 25% by weight, based on the total weight of the activatable material.

Rheology Modifier

The activatable composition preferably includes a rheology modifier. The rheology modifier preferably is a filler material. The rheology modifier may be an organic or an inorganic material. The rheology modifier preferably remains a solid at typical use temperatures and preferably remains a solid at typical processing temperatures. Preferably, the rheology modifier is a solid at a temperature of about 150° C., more preferably at a temperature of about 175° C., even more preferably about 200° C., and most preferably about 225° C. The rheology modifier preferably is a plate shaped or fiber shaped material having an aspect ratio (i.e., a ratio of the longest dimension to the shortest dimension, such as the length to diameter ratio of fibers) of about 3 or more, preferably about 5 or more, more preferably about 10 or more, and most preferably about 20 or more. An organic rheology modifier may include, consist essentially of, or consist entirely of polymeric fibers. Particularly preferred polymeric fibers include polyaramid fibers (e.g., para-aramid fibers, such as KEVLAR® fibers). Preferred fibers for the rheology modifier have an average length of about 50 mm or less (e.g., about 35 mm or less).

The viscosity modifier preferably increases the zero shear viscosity of the composition (measured at about 100° C.) by about 10% or more, more preferably about 40% or more, and most preferably about 100% or more. For example, such increases in the viscosity may be obtained with about 3% of the viscosity modifier, about 2% of the viscosity modifier, about 1% of the viscosity modifier, or even less than 1% of the viscosity modifier.

The composition may include one or more additives. Preferred additives include antioxidants, heat stabilizers, process aids, flame retardants, and other stabilizers.

Compounding

The polymeric adhesive compositions (i.e., the activatable compositions) according to the teachings may be compounded using any method employed in the compounding of polymers. The ingredients may be compounded together in a single step or in a plurality of steps (such as by employing intermediate steps to compound together at least a portion of the ingredients). A compounding step may employ a batch mixer and/or a continuous mixer. Examples of continuous mixers that may be employed include extruders and kneaders, such as a single screw extruder and a twin screw extruder. Any step of compounding may employ application of shear, application of heat, cooling, or any combination thereof. For example, heat may be added in a first stage of compounding (e.g., to melt or soften a polymer) and cooling may be applied at a second later stage (e.g., to reduce or prevent premature reaction of an ingredient). The compounding of the activatable compositions preferably is performed at a temperature sufficiently low so that curing of the epoxy resin is substantially avoided. The compounding of the activatable compositions preferably is performed at conditions (e.g., sufficiently low temperature and/or sufficiently low shear rate) such that the particle size of the core/shell polymer is substantially maintained. The compounding of the activatable composition preferably is performed using sufficient shear so that some or all of the agglomerated core/shell particles are de-agglomerated during the processing. This may be particularly advantageous when employing dry core/shell particles.

In preparing an activatable material according to the teachings herein, it is contemplated that an intermediate compounding step may be employed that includes compounding the high glass transition temperature thermoplastic polymer with at least a portion of the liquid epoxy resin prior to compounding the high glass transition temperature thermoplastic polymer with one or more other ingredients (e.g., an impact modifier, a filler, a curative, a blowing agent, a solid epoxy resin, or any combination thereof). Such an intermediate compound preferably includes the high glass transition temperature thermoplastic polymer in an amount of about 5 weight percent or more of, more preferably about 15 weight percent or more, even more preferably about 25 weight percent or more, and most preferably about 35 weight percent or more. For example, the intermediate compound may be a blend including, consisting substantially of, or consisting entirely of about 30 to about 80 weight percent liquid epoxy resin and about 20 to about 70 weight percent of the high glass transition temperature thermoplastic polymer. The process may include a step of compounding the intermediate compound with one or more additional ingredients (e.g., an impact modifier, a filler, a curative, a blowing agent, a solid epoxy resin, additional liquid epoxy resin, or any combination thereof). The fully compounded polymeric adhesive composition preferably is a multiphase material including one or more filler phases and a continuous polymer phase. The continuous polymer phase may also comprise multiple phases including a first polymer phase including the impact modifier and a second polymer phase including the high glass transition thermoplastic polymer. The epoxy resin may be present in the first or second polymer phase. Preferably some or all of the epoxy resin is present in a third polymer phase.

The polymeric adhesive composition is an activatable material and may need to be stored under conditions that minimizes or reduces reactions during storage. For example, the polymeric adhesive composition may be stored at temperature of about 80° C. or less, preferably about 60° C. or less, even more preferably about 45° C. or less, and most preferably about 40° C. or less.

The polymeric adhesive composition is a solid material and may be stored as slabs, as shaped parts (e.g., preform parts, or otherwise), as pellets, and the like. The polymeric adhesive composition may have a shape and/or size suitable for feeding into a screw and barrel assembly, such as for an extrusion machine, an injection molding machine, or a blow molding machine. For example, the polymeric adhesive composition may be in the form of pellets or other particles having a mass of about 1 g or less and/or having a mass of about 0.01 g or more. The polymeric adhesive composition may have a shape and/or size suitable for applying to a surface using a spraying device, such as electrospray, a compressed gas spray gun, or other spraying device having a spray nozzle. For example, the polymeric adhesive composition may be in the form of small particles (e.g., having a mass of about 0.05 g or less, about 0.01 g or less, or about 0.001 g or less). The polymeric adhesive composition may be in the form of microparticles. It will be appreciated that particles having a high surface to volume ratio may have a generally higher propensity to agglomerate than larger particles. Preferably, the composition is free of pellet blocking and powder agglomeration. The ratio of the solid epoxy component(s) to the liquid epoxy component(s) preferably is sufficiently high so that the particles of the polymeric adhesive composition are free flowing and agglomeration is avoided prior to being applied to a surface.

The polymeric adhesive composition may be shaped into a part or a component using any shaping process employed in the shaping of polymeric materials. For example, the polymeric adhesive composition may be shaped using an injection molding machine, using an extruder (e.g., extruding through one or more dies, such as to achieve a desired profile shape), using a compression molding machine, using a mill, using a cutting device, using a thermoforming device, using a robotic extrusion device, and the like. The step of shaping the polymeric adhesive composition may employ shear and heat. The polymeric adhesive composition may be extruded or molded directly onto a substrate to which it will be adhered. The polymeric adhesive composition may be shaped into a part for adhering to a substrate at a later stage. It will be appreciated that the polymeric adhesive composition may be used in an application that adheres two or more substrates or components. The polymeric material may be extruded or molded directly onto both of the components to be adhered. The polymeric material may be extruded or molded directly onto one of the components to be adhered and attached to the second component at a later time. The polymeric material may be shaped without contacting the components to be adhered and may only contact the components at one or more later times.

Although the activatable material may adhere to the substrates and/or components, the material requires curing and/or activation of the blowing agent to increase the adhesion. The curing may be performed at one or more temperatures of about 140° C. or more, for a total time of about 5 minutes or more. For example, the curing temperature preferably is about 150° C. or more, more preferably about 160° C. or more, and most preferably about 170° C. or more. The curing time preferably is about 10 minutes or more, more preferably about 20 minutes or more, and most preferably about 25 minutes or more. The curing temperature is preferably about 275° C. or less, and more preferably about 225° C. or less. The curing time is preferably about 12 hours or less, more preferably about 2 hours or less, and most preferably about 1 hour or less.

Applications

The activatable materials according to the teachings herein may be employed in applications required adhesion at elevated temperatures (such as elevated working temperatures). For example, after activation (e.g., crosslinking and/or expansion) may provide adhesion at elevated temperatures of about 100° C. or more, about 120° C. or more, about 140° C. or more, or about 180° C. As such, the materials may be employed in under the hood applications in a vehicle having an internal combustion engine. For example, the materials may be employed in a hybrid vehicle having an electric motor and an internal combustion engine. Such hybrid vehicles may beneficially employ the activatable materials for adhering one or more components that is exposed to a operating temperatures of about 160° C. or less (preferably about 140° C. or less) and/or peak temperature excursions of about 200° C. or less (preferably about 180° C. or less). For example, the activatable material may be employed for adhering components exposed to an operating temperature of about 100° C. or more (or about 110° C. or more, or about 120° C. or more) and/or a peak temperature of about 140° C. or more (or about 160° C. or more, or about 170° C. or more).

Device

A polymeric adhesive component including a high glass transition temperature thermoplastic resin according to the teachings herein may be employed in a device for adhering two or more components of the device. For example, the device may include a first component attached to one or more second components by a polymeric adhesive component. The polymeric adhesive component may be formed from a polymeric adhesive composition, such as a polymeric adhesive composition according to the teachings herein. Typically, the polymeric adhesive composition is cross-linked or otherwise reacted and/or expanded (e.g., using one or more blowing agents) in forming the polymeric adhesive component. The second components may be attached to a surface of the first component that is flat or curved. Preferably, the second components are attached to a surface of the first component that is curved. For example, the first component may have a surface that is cylindrical ring in shape (or a portion or section of a cylindrical ring). More preferably the second components are attached to a concave surface of the first component. The first component may have an axis of rotation and a length that extends in the direction of the axis of rotation.

The first component may be a metal, a polymer, a ceramic, or any combination thereof. Preferably the first component consists substantially of or entirely of a metal material.

The second component may be a metal, a polymer, a ceramic, or any combination thereof. Preferably the second component consists substantially of or entirely of a metal material. The first component or the second component may be formed of the same material or from different materials. The second components may have a length. Preferably the second component is arranged so that the length of the second component is parallel with the axis of rotation of the first component. The second component may have a width. Preferably the width of the second component is aligned with a tangential direction of a curved surface of the first component. The second component may have a thickness. Preferably the thickness of the second component extends from the polymeric adhesive towards the axis of rotation of the first component, and/or in a direction parallel to the normal direction of the curved surface of the first component (e.g. in a radial direction). One or more (e.g., each) of the second components may have a lateral surface that is in contact with or attached to a lateral surface of an adjacent second component. For example, a second component may have opposing first and second lateral surfaces where the first lateral surface is in contact with or attached to a lateral surface of a first adjacent second component, and the second lateral surface is in contact with or attached to a lateral surface of a second adjacent second component. The second component may be described as teeth that protrude from the first component. Two adjacent second components preferably nest or interlock with each other. As such, the lateral surfaces may include features such as one or more grooves and/or one or more ridges that allow for such nesting and/or interlocking. It will be appreciated that the lateral surface may instead be generally flat surfaces. The device may include a sufficient number of second components (e.g., teeth) so that the second components substantially or entirely cover a circumference (e.g., a circumference of a concave surface) of the first component. By way of example, the first substrate may include or consist of a ring having an axis and some or all of a circumference (e.g., an inner circumference or an outer circumference) of the ring may be covered by the teeth. The teeth may have a length aligned with the axis of the ring. The polymeric adhesive component may be used for attaching the teeth in a stator ring. The teeth may form a magnetic field or include a wire winding. Such a stator ring containing device may be particularly suitable for a motor, such as a hybrid motor in a vehicle.

The polymeric adhesive component may have a uniform thickness (e.g., between the first component and the second component) or may have a thickness that varies. The thickness of the polymeric adhesive component may be sufficient so that the polymeric adhesive component can provide mechanical durability to the device. Preferably, the polymeric adhesive component has a thickness of about 0.1 mm or more, more preferably about 0.4 mm or more, and most preferably about 0.6 mm or more. The polymeric adhesive component preferably has a thickness of about 10 mm or less, more preferably about 5 mm or less, even more preferably about 2.5 mm or less, and most preferably about 1.8 mm or less. The polymeric adhesive component may be expanded (e.g., so that it has open cells and/or closed cells) or may be substantially free of expansion. The level of expansion is the ratio of the increase in volume to the initial volume of the polymeric adhesive composition prior to expansion, expressed as a percentage:

$$V.E. = 100\% \times (V_{expanded} - V_{initial}) / V_{initial}.$$

The level of expansion of the polymeric adhesive component may be about 0% or more, about 10% or more, about 20% or more, or about 40% or more. The level of expansion of the polymeric adhesive component preferably is about 400% or less, more preferably about 220% or less, even more preferably about 130% or less, and most preferably about 70% or less.

The first component and second component(s) may be attached by arranging the polymeric adhesive composition between the first and second components and then heating the materials for curing and/or expanding the polymeric adhesive composition so that the polymeric adhesive component is formed. The polymeric adhesive composition may be supplied as a separate component, such as a pre-cured component that is molded, extruded or otherwise shaped, or may be attached to the first or second components prior to heating (e.g., prior to curing and/or expanding). The heating may include heating to a temperature of about 100° C. or more, about 140° C. or more, about 150° C. or more, or about 170° C. The heating may be for a sufficient time so that the composition expands and/or cures. The heating temperature should be sufficiently low so that any degradation of the polymeric adhesive composition is reduced, minimized, or eliminated. Preferably the heating temperature is about 320° C. or less, more preferably about 260° C. or less, even more preferably about 210° C. or less, and most preferably about 190° C. or less.

The devices according to the teachings herein may be particularly useful for applications having generally high operating temperatures, such as an operating temperature of about 130° C. or more, about 150° C. or more, about 163° C. or more, or about 170° C. The operating temperature preferably is about 280° C. or less, more preferably about 220° C. or less, and most preferably about 200° C. or less.

It will be appreciated that useful devices may include one or more additional components in addition to the first component, the second component(s), and a component formed from the polymeric adhesive composition. For example, the device may include one or more components including windings for carrying an electric current and/or one or more components axially aligned with the rotational axis of the cylinder (e.g., having a rotational axis that is identical to the rotational axis of the cylinder) of the first substrate (e.g., for rotating about the rotational axis or for supporting a component that rotates).

Figure 3:
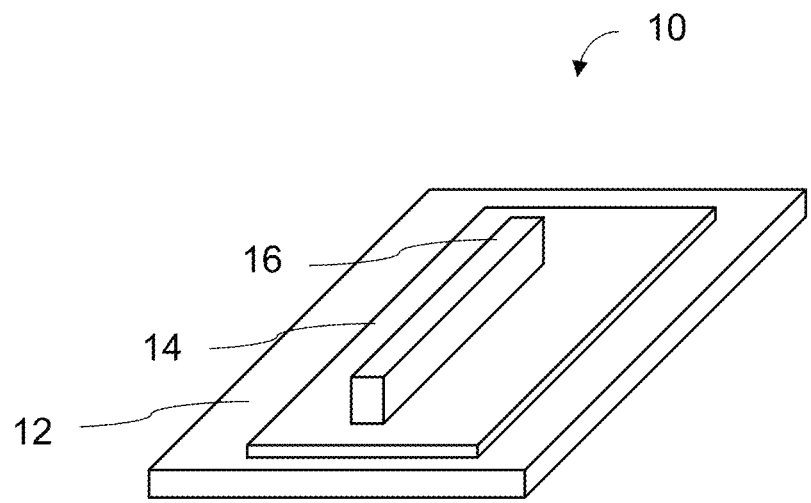
FIG. 3 is a drawing of an illustrative part including two or more components attached by a polymeric adhesive component (e.g., formed by curing a polymeric adhesive composition according to the teachings herein).
Figure 4:
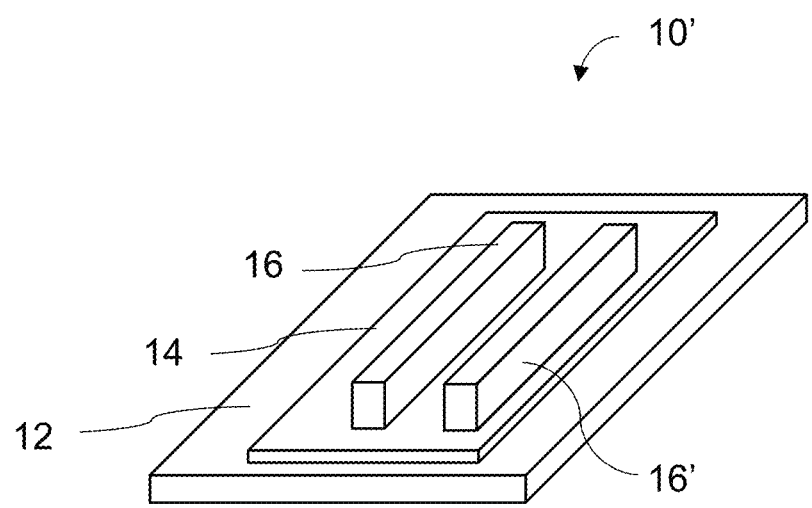
FIG. 4 is a perspective view illustrating features of a device including a first component (e.g., a first substrate) that is adhered to two or more second components (e.g., second substrates) by a polymeric adhesive component (e.g., formed by curing a polymeric adhesive composition according to the teachings herein).
Figure 5:
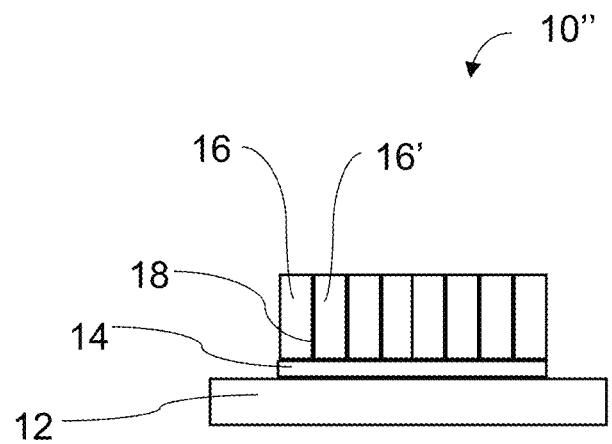
FIG. 5 is a side view illustrating features of a device including a first component that is attached to two or more teeth by a polymeric adhesive component, where two adjacent teeth are in direct contact with each other and/or directly adhered.
Figure 6:
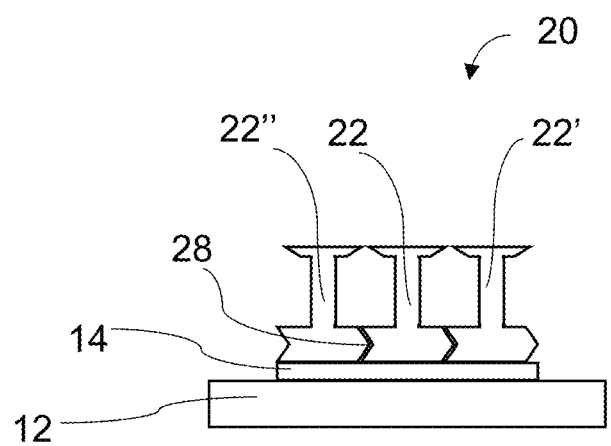
FIG. 6 is a side view illustrating features of a device including a plurality of teeth that are laterally nested and attached to a substrate by a polymeric adhesive component (e.g., formed by curing a polymeric adhesive composition according to the teachings herein).

FIG. 3 illustrates features of a device 10 including a first component (i.e., a first substrate) 12 attached to a second component (i.e., a second substrate) 16, by a polymeric adhesive 14. With reference to FIG. 3, the polymeric adhesive 14 may cover the space between the first component 12 and the second component 16 and/or may directly attach the first component 12 and the second component 16. FIG. 4 illustrates features of a device 10' having two or more second components 16, 16', each attached to the first component 12. As illustrated in FIG. 5, a second component 16 may be in contacted with and/or attached to another second component 16' along a lateral surface 18. As illustrated in FIG. 6, the device 20 may include a plurality of second components 22, 22', 22" that nest. For example, a second components may have a lateral surface 28 that mates with a lateral surface of an adjacent second component.

Figure 7:
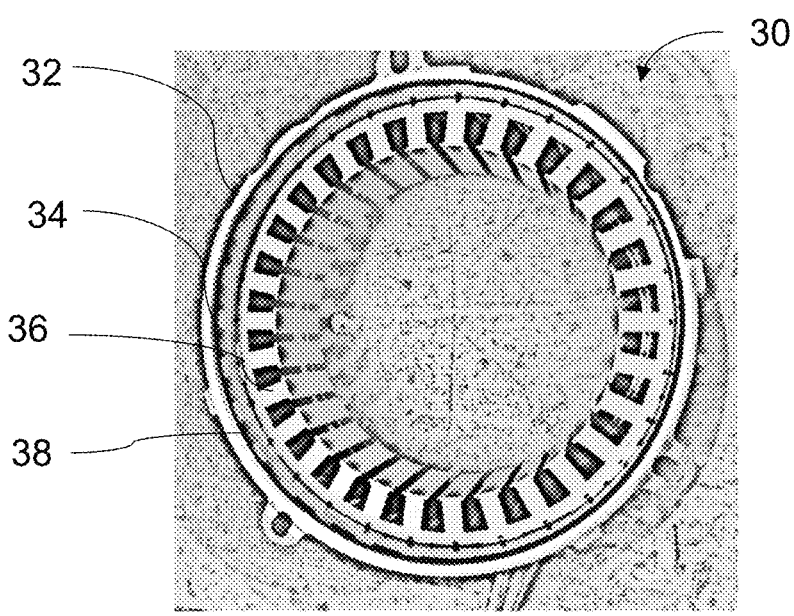
FIG. 7 is a perspective view from a side showing features of an illustrative device including a cylindrical shaped first substrate and a plurality of teeth attached to an interior surface of the first substrate by a polymeric adhesive component (e.g., formed by curing a polymeric adhesive composition according to the teachings herein).
Figure 8:
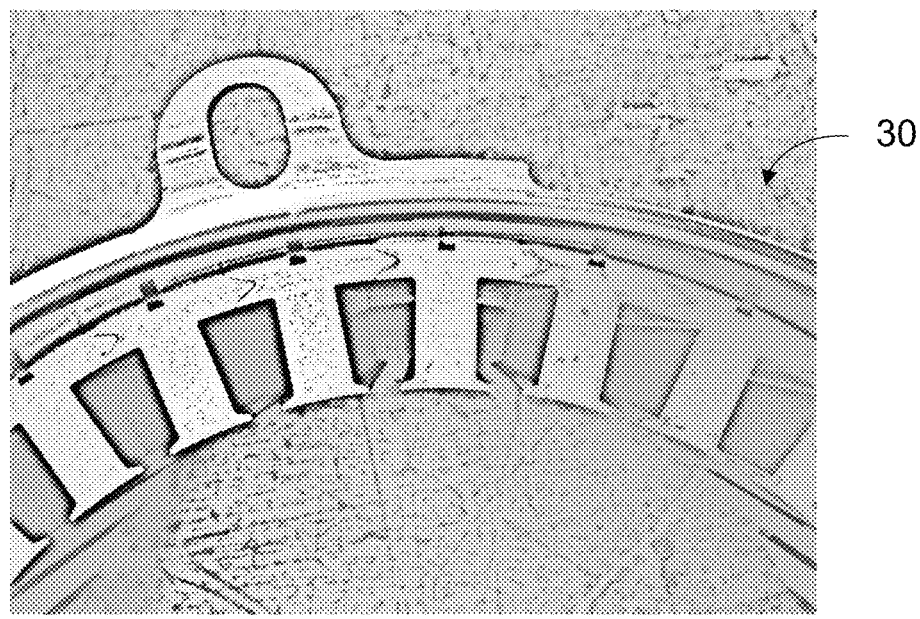
FIG. 8 is a side view showing a portion of the device illustrated in FIG. 7.
Figure 9:
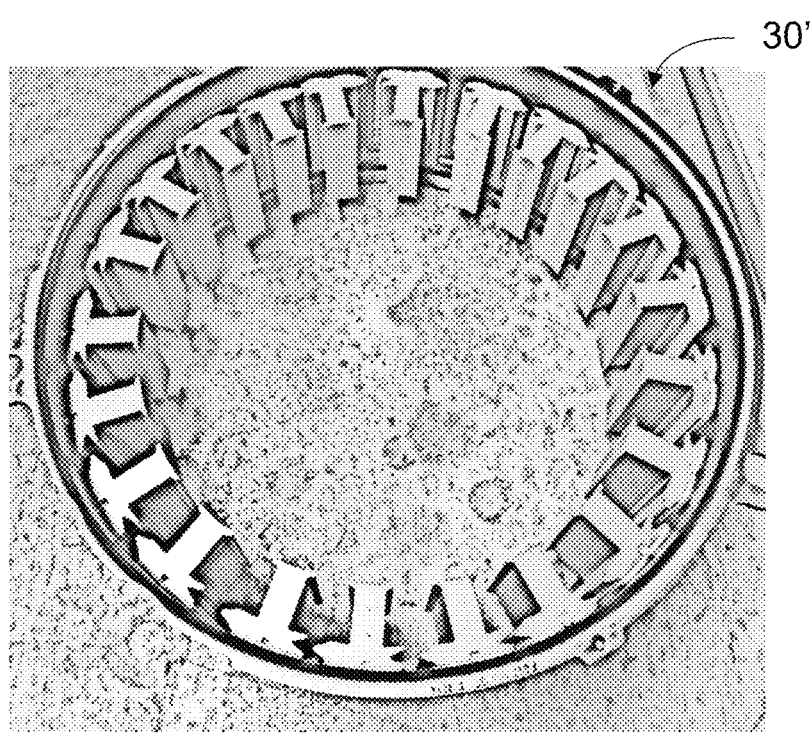
FIG. 9 is a perspective view from a side showing features of an illustrative device including a cylindrical shaped first substrate and a plurality of teeth attached to an interior surface of the first substrate by a polymeric adhesive component (e.g., formed by curing a polymeric adhesive composition according to the teachings herein).

With reference to FIG. 7-9, the first component 32, may have a curved surface 38. For example, the first component 32, may have a cylindrical ring shape. As such, the first component may have an axis of rotation (e.g., the axis of the cylinder). The second components 36 may be attached to the first component 32 by a layer of the polymeric adhesive 34 that substantially or entirely covers a circumference of the surface 38 of the first component 32. Adjacent second components may be in contact or directly attached (e.g., as shown in FIG. 7 and FIG. 8) or may be spaced apart (e.g., as shown in FIG. 9).

Test Method

Volume expansion is calculated by first measuring the initial volume (at about 25° C.) of a 23 mm×25 mm×1 mm specimen of the polymeric adhesive composition, curing the composition at 175° C. for 30 minutes, and then measuring the volume after the cured material has cooled to about 23° C. The volume expansion is the ratio of the increase in volume to the initial volume.

Unless otherwise stated, density measurements are taken at 23° C.

Figure 1B:
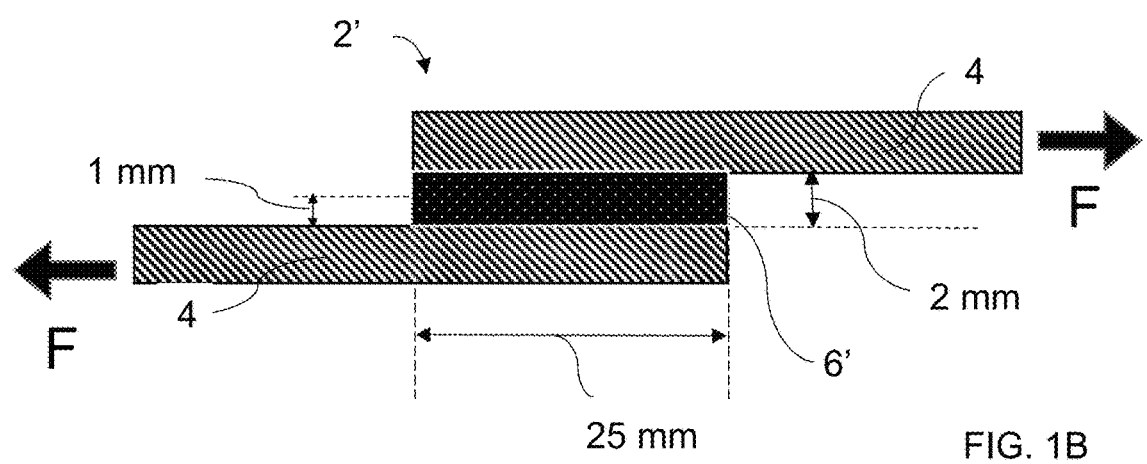
Figure 2:
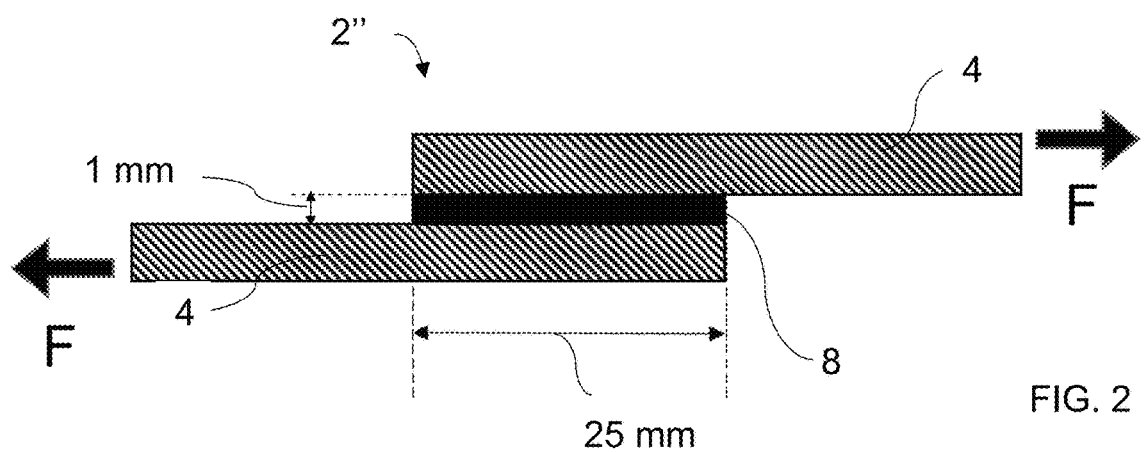
FIG. 2 is a drawing of an illustrative lap shear test specimen for testing an activatable material that is free of blowing agent.

Lap shear test is performed on a tensile test device at a cross-head speed of 10 mm/min. All specimens are cured at 175° C. for 30 minutes and then cooled to room temperature prior to testing. The initial sample size is 25×25×1 mm, such as illustrated in FIGS. 1A, and 2. For materials that include a blowing agent the amount of blowing agent is selected to result in a volume expansion of 150 to 350 percent (see e.g., FIG. 1A before expansion and FIG. 1B after expansion of the polymeric adhesive composition 6 and 6'). When testing the materials including a blowing agent, a bond line thickness of 2 mm is used (FIGS. 1A and 1B). When testing the material without a blowing agent (or with minimal expansion) 8, a bond line thickness equal to the thickness of the uncured specimen is used (i.e., 1 mm), such as illustrated in FIG. 2. With reference to FIGS. 1A, 1B, and 2, the lap shear testing is performed on substrates 4, preferably of 1.8 mm thick hot dipped galvanneal which are free of oil. The maximum stress in MPa is measured. The lap shear is tested at a cross-head rate of 10 mm/min with a distance of about 112.5 mm between the grips.

The type of failure is characterized (according to PSA Peugeot Citroen, Méthode d'essai matériaux, D41 1108, ADHESIFS RESISTANCE EN TRACTION-CISAILLE-MENT (METHODE DES CALES), Jun. 10, 2008, incorporated herein by reference in its entirety) and recorded. Unless otherwise stated, the failure mode is characterized as 100% superficial cohesive failure, which is considered cohesive failure.

Unless otherwise specified the hot dipped galvanneal is HDG HX420LAD+Z100MBO and is cleaned with acetone and dried prior to preparing the specimens.

Lap shear testing is done at various temperatures (e.g., at 23° C., 90° C., 120° C., 150° C., 180° C., and 210° C.) on specimens cured at a 175° C. for 30 minutes.

Tensile testing is measured according to ISO 527, using a specimen type JISK 6301-1-MET, having a dogbone shape with a total length of about 120 mm, a width in the wide tab sections of about 25 mm, and a width in the narrow test regions of about 10 mm. The test speed (cross-head rate) is about 10 mm/min, the distance between the grips is about 75 mm, and the extensometer distance is about 35 mm. Tensile properties are measured at about 23° C. on uncured specimens and under controlled temperature conditions of 23° C., 120° C., 150° C., 180° C., or 210° C. on cured specimens (cured at 175° C. for 30 minutes).

EXAMPLES

Ingredients

OMICURE™ 52M is an aromatic substituted urea commercially available from EMERALD PERFORMANCE MATERIALS LLC, Moorestown, NJ, including 95-100 weight percent methylene diphenyl bis(dimethyl urea).

Epoxy A: ARALDITE® 6097 is a solid unmodified bisphenol-A based epoxy resin (type 7) having a softening point of about 125-135° C., an epoxide equivalent weight of about 1,695-1,885 (as measured according to ISO 3001), a density of about 1.20 g/cm$^3$ (measured at 25° C.), a viscosity of about 1800-2600 mPa s (Falling ball method measured according to ISO 12058-1 at 25° C., 40% in butylcarbitol), a Mettler softening point of about 121-132° C. (measured according to DIN 51920), and a hydroxyl content of about 3.2 eq/kg (measured according to ISO/DIS 4629), and is commercially available from HUNTSMAN ADVANCED MATERIALS AMERICAS, The Woodlands, Texas.

Epoxy B: ARALDITE® ECN 9699 is an epoxy cresol novolac resin having and functionality of about 5.5, a viscosity of about 7,000-10,000 mPa s (measured at 130° C.), an epoxy equivalent weight of 205-225 g/equivalent, and a Mettler softening point of about 80-100° C., and is commercially available from HUNTSMAN ADVANCED MATERIALS AMERICAS, The Woodlands, Texas.

Epoxy C1—ARALDITE® EPN 9850 is an epoxy phenol novolac resin having an epoxy equivalent weight of about 168-178, a density of about 1.2 g/cm$^3$ at 25° C., and a viscosity of about 20,000-26,000 cP at 25° C.

Epoxy C2—EPALLOY® 8250 is an epoxy phenol novolac resin having an epoxy equivalent weight of about 165-178, a viscosity of about 18,000-28,000 cps at 25° C., a functionality of about 2.65, and a residual epichlorohydrin concentration of about 10 ppm, and is commercially available from EMERALD PERFORMANCE MATERIALS LLC, Moorestown, NJ.

Kane Ace 267 is a core/shell polymeric particles having a core of a poly(butadiene) rubber dispersion (about 37% weight percent) and EPON® 863 liquid bisphenol F (about 63 weight percent) and is commercially available from Kaneka Texas Corporation (Pasedena, TX). The particles have a diameter of about 100 nm to about 300 nm.

Epoxy D: ARALDITE® GY282 is a liquid bisphenol F epoxy resin having an epoxy equivalent weight of about 171.

GENITRON® LE is an Azodicarbonic acid diamide preparation having an average particle size of about 3.1-4.5 microns, and a concentration of azodicarbonic acid diamide of about 57-63 weight percent, and is commercially available from LANXESS US (Pittsburgh, PA).

Masterbatch A is a masterbatch including about 20 weight percent KEVLAR® brand aramid fiber pulp and about 80 weight percent bisphenol-A solid epoxy resin.

Dyhard 100S—Is a micronized dicyandiamide curing agent.

UDELL® P1700 is a thermoplastic polysulfone having a melt flow rate of about 6.5 g/10 min as measured according to ASTMD D1238 at 343° C./2.16 kg, a specific gravity of about 1.24 as measured according to ASTM D792, a tensile modulus of about 2480 MPa as measured according to ASTM D638, an elongation at break of about 50-100% as measured according to ASTM D638, a flexural modulus of about 2690 MPa as measured according to ASTM D790, a heat distortion temperature of about 174° C. as measured according to ASTM D648 under a load of 1.8 MPa, unannealed, a glass transition temperature of about 185° C. to about 215° C., and a notched Izod impact strength of about 69 J/m as measured according to ASTM D256, and is commercially available from SOLVAY.

Example 1

Example 1 is prepared by mixing UDELL® P1700 thermoplastic polysulfone with a portion of epoxy C at a weight ratio of about 1:1 to form an epoxy/sulfone blend. The epoxy/sulfone blend is th1en compounded with epoxy A, epoxy B, pigment, additional epoxy C1, Core/shell polymer A, Masterbatch A, Calibrite OG, zinc oxide, Dyhard 100S, Omicure 52M, and Genitron LE, in the proportions shown in Table 1. The compounding temperature was maintained below 100° C. The density and tensile properties of the activatable composition are measured at about 23° C. Cured tensile specimen are prepared by curing the material at 175° C. for 30 minutes. The tensile properties of the cured material are measured at about 23° C. and at about 150° C. The volume expansion of the material is measured after curing at 175° C. for 30 minutes. As Example 1 includes blowing agent for expansion, lap shear testing is performed with a sample having an initial thickness of about 1 mm and a bond line of about 2 mm. During the curing at 175° C. for 30 minutes, the material expands and bonds to both metal pieces. Lap shear is measured at about 23° C., 90° C., 120° C., 150° C., 180° C., and 210° C. The test results are shown in Table 1.

Example 2 is prepared and tested the same as Example 1, except the amounts of some of the ingredients are changed.

Example 3 is prepared the same as Example 2, except the sample does not include the blowing agent or the zinc oxide, and the amount of the calcium carbonate is increased. As there is no blowing agent, the bond line for the lap shear testing is set at the sample thickness, so that the material contacts both metal pieces.

Example 1, Example 2, and Example 3 are expected to have a heat distortion temperature greater than 60° C. as measured according to ASTM D648 under a load of 1.8 MPa. After curing at 175° C. for 30 minutes, Example 1, Example 2, and Example 3 are expected to have a heat distortion temperature greater than 160° C. as measured according to ASTM D648 under a load of 1.8 MPa.

Comparative Example is prepared the same as Example 2, except the sample does not include the polysulfone and the core/shell polymer. Amounts of other composition ingredients (including the amount of epoxy A, the addition of epoxy D, and the amount of the calcium carbonate) are thus increased. The Comparative Example loses most of its strength from 23° C. to 150° C. This material is not dry to the touch and cannot be pelletized.

TABLE 1

| Composition | | Example 1 Weight % | Example 2 Weight % | Example 3 Weight % | Comparative Example Weight % |
|---|---|---|---|---|---|
| Pigment | | 0.05 | 0.05 | 0.05 | 0.05 |
| Epoxy A (Araldite GT 6097) | | 13.64 | 11.33 | 11.33 | 30.24 |
| Polysulfone | | 18.90 | 18.905 | 18.905 | |
| Epoxy D (Araldite GY282) | | | | | 6.27 |
| Masterbatch A | | 2.08 | 2.08 | 2.08 | 2.08 |
| Epoxy B (Araldite ECN 9699) | | 7.27 | 9.45 | 9.45 | 9.45 |
| Epoxy C2 (Epalloy 8250) | | | | | |
| Epoxy C1 (Araldite EPN 9850) | | 28.36 | 28.355 | 28.355 | 28.35 |
| Core/shell Polymer A (Kane Ace 267) | | 8.96 | 8.96 | 8.96 | |
| Calibrite OG | | 12.76 | 15.13 | 16.98 | 17.78 |
| Zinc Oxide (Extra R) | | 0.1 | 0.1 | | 0.1 |
| Dyhard 100S | | 5.53 | 3.29 | 3.29 | 3.32 |
| Omicure U52M | | 0.60 | 0.60 | 0.60 | 0.60 |
| Genitron LE | | 1.75 | 1.75 | | 1.75 |
| Total | | 100.00 | 100.00 | 100.00 | 100.00 |
| Density (g/cm³) | | 1.27 | 1.26 | 1.31 | 1.26 |
| Volume expansion of 25 mm × 25 mm × 1 mm specimen after 30 minutes at 175° C. | | | | | |
| Volume expansion | percent | 317 | 278 | 47 | 266 |
| Lap Shear Properties at 23° C. (1.7 mm HDG, no oil, 25 × 25 × 2 mm) 1 mm thick material | | | | | |
| Maximum Stress | MPa | 4.20 | 4.63 | 8.50 | 5.53 |
| Cohesive Failure | percent | 100 (SCF) | 100 (SCF) | 100 (SCF) | 100 (CF) |
| Lap Shear Properties at 90° C. (1.5 mm HDG no oil, 25 mm × 25 mm × 2 mm) 1 mm thick material) | | | | | |
| Maximum Stress | MPa | 3.73 | 3.27 | 7.87 | 5.10 |
| Cohesive Failure | percent | 100% SCF | 100% SCF | 100% SCF | 100% SCF |
| Lap Shear Properties at 120° C. (1.5 mm HDG no oil, 25 mm × 25 mm × 2 mm) 1 mm thick material) | | | | | |
| Maximum Stress | MPa | 2.68 | 3.18 | 6.91 | 3.31 |
| Cohesive Failure | percent | 100 (SCF) | 100 (SCF) | 100 (SCF) | (100 CF) |
| Lap Shear Properties at 150° C. (1.5 mm HDG no oil, 25 mm × 25 mm × 2 mm) 1 mm thick material) | | | | | |
| Maximum Stress | MPa | 1.23 | 1.76 | 13.30 | 0.72 |
| Cohesive Failure | percent | 100 (SCF) | 100 (SCF) | 100 (CF/SCF) | 100 (CF) |
| Lap Shear Properties at 180° C. (1.5 mm HDG no oil, 25 mm × 25 mm × 2 mm) 1 mm thick material) | | | | | |
| Maximum Stress | MPa | 0.6 | 0.6 | 4.03 | 0.31 |
| Cohesive Failure | percent | 100 (CF)_ | 100 (CF) | (AF) | (CF) |
| Lap Shear Properties at 210° C. (1.5 mm HDG no oil, 25 mm × 25 mm × 2 mm) 1 mm thick material) | | | | | |
| Maximum Stress | MPa | 0.20 | 0.17 | 1.11 | 0.14 |
| Cohesive Failure | percent | 100 (CF) | 100 (CF) | (100 CF) | 100 (CF) |
| Tensile Properties of the uncured material, measured at 23° C. (ISO 527) @ 100 mm/min | | | | | |
| Modulus | MPa | 133.11 | 124.34 | 280.75 | 8.39 |
| Maximum Stress | MPa | 5.73 | 4.52 | 4.91 | 0.194 |
| Strain at failure | percent | 114.86 | 182.48 | 109.91 | >230 |

TABLE 1-continued

| Composition | | Example 1 Weight % | Example 2 Weight % | Example 3 Weight % | Comparative Example Weight % |
|---|---|---|---|---|---|
| Tensile Properties of the cured material (cured at 175° C. for 30 minutes) Tensile properties at 23° C. (ISO 527) @ 10 mm/min | | | | | |
| Modulus | MPa | 623.04 | 348.13 | 1950.79 | 310.19 |
| Maximum Stress | MPa | 8.31 | 6.24 | 32.7 | 4.53 |
| Strain at failure | percent | 2.43 | 1.49 | 2.2 | 1.72 |
| Tensile properties at 150° C. (ISO 527) @ 10 mm/min | | | | | |
| Modulus | MPa | 83.92 | 61.02 | 332.42 | 1.43 |
| Maximum Stress | MPa | 2.37 | 2.5 | 11.5 | 0.286 |
| Strain at failure | percent | 23.15 | 17.98 | 21.26 | 19.45 |
| DSC | | | | | |
| DSC Peak (° C.) | | 168.44 | 162.25 | 157.64 | 164.74 |
| DSC Onset (° C.) | | 154.4 | 147.18 | 146.49 | 144.80 |
| DSC Enthalpy (J/g) | | 251.4 | 244.40 | 210.00 | 246.40 |
| Viscosity RPA at 90° C. | | | | | |
| 1.0 rad/s (kPa * s) | | 7.28 | 7.06 | 7.36 | 1.46 |
| 9.1 rad/s (kPa * s) | | 2.02 | 2.19 | 2.68 | 0.19 |
| 100 rad/s (kPa * s) | | 0.53 | 0.58 | 0.73 | 0.04 |
| DMA (1 × 10$^{-5}$ m @ 40 Hz) | | | | | |
| E' @ 23° C. | MPa | 845.00 | 755.00 | 3310.00 | 783.00 |
| E" Max | ° C. | 122.90 | 130.90 | 130.90 | 118.40 |
| Tan delta peak | ° C. | 149.6 & 193.1 | 151.6 & 186.9 | 148.90 | 149.80 |

SCF: superficiail cohesive failure
CF: Cohesive failure
AF: Adhesive failure

What is claimed is:

1. A device comprising:
   i) a first substrate;
   ii) one or more second substrates attached to the first substrate by:
   iii) a polymeric adhesive component formed from a polymeric adhesive composition including a blend of epoxy resins and one or more high temperature thermoplastic polymers having a glass transition temperature of about 175° C. or more;
   wherein the epoxy resins include one or more solid epoxy resins and one or more liquid epoxy resins;
   wherein the polymeric adhesive composition is shapable and is capable of curing at a temperature of 150° C.;
   wherein the one or more high temperature thermoplastic polymers includes a polysulfone;
   wherein the polysulfone is free of functional groups for reacting with epoxy; and is provided as an intermediate compound comprising at least a portion of the one or more liquid epoxy resins.

2. The device of claim 1, wherein the polymeric adhesive composition comprises:
   i) about 25 to about 85 weight percent of the epoxy resins, based on the total weight of the polymeric adhesive composition;
   ii) about 7 to about 45 weight percent of the one or more high temperature thermoplastic polymers (based on the total weight of the polymeric adhesive composition) having a glass transition temperature of about 175° C. or more;
   iii) about 0.5 to about 20 weight percent of one or more impact modifiers, wherein the one or more impact modifiers includes an elastomeric polymer core of a core/shell polymer;
   iv) one or more curatives for curing the epoxy resins in an amount from about 0.4 to about 15 weight percent, based on the total weight of the polymeric adhesive composition; and
   v) optionally up to 40 weight percent of one or more fillers; and
   vi) optionally up to about 7 weight percent of one or more blowing agents;
   wherein the concentration of the one or more solid epoxy resin is sufficiently high so that the polymeric adhesive composition has a tensile modulus of about 20 MPa or more, as measured according to ISO 527 at about 23° C.

3. The device of claim 2, wherein the first substrate is a cylindrical ring, and each of the one or more second substrates is attached to an inside surface of the cylindrical ring.

4. The device of claim 3, wherein the first substrate is a stator ring, and the one or more second substrates are teeth each having a length aligned with an axis of the stator ring, and arranged for substantially or entirely covering an inner circumference of the stator ring, optionally wherein the device is a hybrid motor.

5. The device of claim 2, wherein the first substrate is a metal and the one or more second substrates is the same metal or a different metal.

6. The device of claim 1, wherein the one or more second substrates includes a plurality of interlocking teeth.

7. The device of claim 2, wherein the first substrate and the one or more second substrates are both adhered to the polymeric adhesive component by heating the polymeric adhesive composition to a temperature of about 150° C. or more for a sufficient time to cause the solid epoxy resin to cure.

8. The device of claim 7, wherein after curing the polymeric adhesive composition:

i) the polymeric adhesive component is in an expanded state including open cells and/or closed cells; and/or ii) the polymeric adhesive component has a thickness from about 0.1 mm to about 10 mm.

9. The device of claim 8, wherein the high temperature thermoplastic has a melt flow rate from about 0.2 to about 100 g/10 min, as measured according to ASTM D1238 at 343° C./2.16 kg; and the one or more fillers includes short polyaramid fibers having a length of about 50 mm or less.

10. The device of claim 9, wherein the composition includes about 0.5 to 9 weight percent of the one or more impact modifiers.

11. The device of claim 9, wherein the high temperature thermoplastic polymer has a repeat unit with a sulfone group along the backbone with two aryl sulfone linkages; and one or more ether linkages.

12. The device of claim 1, wherein the polymeric adhesive composition is capable of curing at a temperature of 140° C.

13. The device of claim 1, wherein the polymeric adhesive composition is prepared by blending the intermediate compound with at least a curative, wherein the intermediate compound comprises the high temperature thermoplastic polymer and one or more liquid epoxy resins.

14. The device of claim 1, wherein the high temperature thermoplastic polymer has a glass transition temperature of 180° C. or more.

15. The device of claim 13, wherein the high temperature thermoplastic polymer has a glass transition temperature of 190° C. or more.

16. The device of claim 1, wherein the polymeric adhesive component is provided as an activatable part, wherein the activatable part is prepared by a method including injection molding, extruding or blow molding the polymeric adhesive composition.

17. A method of operating a motor including the device of claim 1, including maintaining adhesion between the first substrate and the one or more second substrate while operating at a temperature of about 150° C. or more.

18. A polymeric adhesive composition including a blend of epoxy resins and one or more high temperature thermoplastic polymers having a glass transition temperature of about 175° C. or more;

wherein the epoxy resins include one or more solid epoxy resins and one or more liquid epoxy resins;

wherein the polymeric adhesive composition is shapable and is capable of curing at a temperature of 150° C.;

wherein the one or more high temperature thermoplastic polymers includes a polysulfone;

wherein the polysulfone is free of functional groups for reacting with epoxy; and is provided as an intermediate compound comprising at least a portion of the one or more liquid epoxy resins.

19. The polymeric adhesive composition of claim 18, wherein the polymeric adhesive composition comprises:

i) about 25 to about 85 weight percent of the epoxy resins, based on the total weight of the polymeric adhesive composition;

ii) about 7 to about 45 weight percent of the one or more high temperature thermoplastic polymers (based on the total weight of the polymeric adhesive composition) having a glass transition temperature of about 175° C. or more;

iii) about 0.5 to about 20 weight percent of one or more impact modifiers, wherein the one or more impact modifiers includes an elastomeric polymer core of a core/shell polymer;

iv) one or more curatives for curing the epoxy resins in an amount from about 0.4 to about 15 weight percent, based on the total weight of the polymeric adhesive composition; and v) optionally up to 40 weight percent of one or more fillers; and vi) optionally up to about 7 weight percent of one or more blowing agents;

wherein the concentration of the one or more solid epoxy resin is sufficiently high so that the polymeric adhesive composition has a tensile modulus of about 20 MPa or more, as measured according to ISO 527 at about 23° C.

20. A method of forming a device comprising the steps of:

positioning a first substrate relative to a second substrate so that a polymeric adhesive composition is interposed between the first and second substrates;

heating the polymeric adhesive composition to a temperature of about 150° C. or more for a sufficient time to cure the polymeric adhesive composition and form a cured polymeric adhesive component that adheres the first substrate and the second substrate;

wherein the polymeric adhesive composition includes a blend of epoxy resins and one or more high temperature thermoplastic polymers having a glass transition temperature of about 175° C. or more;

wherein the epoxy resins include one or more solid epoxy resins and one or more liquid epoxy resins;

wherein the polymeric adhesive composition is shapable and is capable of curing at a temperature of 150° C.

wherein the one or more high temperature thermoplastic polymers includes a polysulfone;

wherein the polysulfone is free of functional groups for reacting with epoxy; and is provided as an intermediate compound comprising at least a portion of the one or more liquid epoxy resins.

* * * * *